US007350553B2

(12) United States Patent
Yu Chen

(10) Patent No.: US 7,350,553 B2
(45) Date of Patent: Apr. 1, 2008

(54) GRIPPING SEPARABLE-PAPER PEELER

(76) Inventor: Hsiu-Man Yu Chen, No. 27, Sec. 1, Ta Fu Road, Tan Tzu Hsiang, Taichung (TW) 427

( * ) Notice: Subject to any disclaimer, the term of this patent is extended or adjusted under 35 U.S.C. 154(b) by 444 days.

(21) Appl. No.: 11/130,168

(22) Filed: May 17, 2005

(65) Prior Publication Data
US 2006/0260762 A1    Nov. 23, 2006

(51) Int. Cl.
   *B32B 38/04*    (2006.01)
   *B32B 38/10*    (2006.01)
(52) U.S. Cl. .................. 156/526; 156/577; 156/579
(58) Field of Classification Search ........... 156/574, 156/577, 579, 526
   See application file for complete search history.

(56) References Cited

U.S. PATENT DOCUMENTS

| 4,582,558 A | * | 4/1986 | Antonson | 156/523 |
| 4,857,134 A | * | 8/1989 | Lin | 156/385 |
| 5,851,348 A | * | 12/1998 | Muenzer et al. | 156/577 |
| 6,206,072 B1 | * | 3/2001 | Orihara et al. | 156/540 |
| 6,634,402 B2 | * | 10/2003 | Chen | 156/527 |
| 7,178,575 B2 | * | 2/2007 | Yu Chen | 156/577 |
| 2006/0144512 A1 | * | 7/2006 | Carroll et al. | 156/304.3 |

* cited by examiner

*Primary Examiner*—Mark A Osele
(74) *Attorney, Agent, or Firm*—Ming Chow; Sinorica, LLC

(57) ABSTRACT

A gripping separable paper peeler includes a grip frame, a paper roll holder, two idle gears, a separable paper holder, a pushing roller, and a pressing roller. The paper roll holder has a first gear engaging a second gear of the separable paper holder via the two idle gears, and a separable paper roll is fitted on the paper roll holder, with separable paper separated from gluing paper to be wound on the separable paper holder. While the pushing roller pushes the gluing paper on an object, separating and winding of the separable paper are carried out at the same time, with the pressing roller presses and adheres the gluing paper on the object smoothly.

6 Claims, 6 Drawing Sheets

GRIPPING SEPARABLE-PAPER PEELER

BACKGROUND OF THE INVENTION

1. Field of the Invention

This invention relates to a gripping separable-paper peeler, particularly to one possible to separate easily a separable paper from a gluing paper, to press and adhere flatly the gluing paper on an object.

2. Description of the Prior Art

A conventional separable paper roll is composed of a gluing paper having one surface or both surfaces covered with a separable paper. In using it. The separable paper is at first separated from the gluing paper manually and then the gluing paper is adhered on an abject. At present, there is no appliance for automatically performing separating a separable paper from a gluing paper and then adhering it on an object. So the conventional separable paper roll is quite inconvenient to use.

SUMMARY OF THE INVENTION

The feature of the invention is a grip frame, a paper roll holder, a separable paper holder, two idle gears, a separating member a pushing roller, an a pressing roller combined together. The paper roll holder has a first gear, engaging with a second gear provided on the separable paper holder via the two idle gears. Then a separable paper roll is fitted on the paper roll holder, with a separable paper separated by the separating member from the gluing paper in the separable paper roll and wound on the separable paper holder after the gluing paper is used to be adhered on an object. Then the gluing paper separated from the separable paper is pressed and adhered on an object by the pressing roller, so the separable-paper peeler in the invention can carry out separating and winding up the separable paper at the same time.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
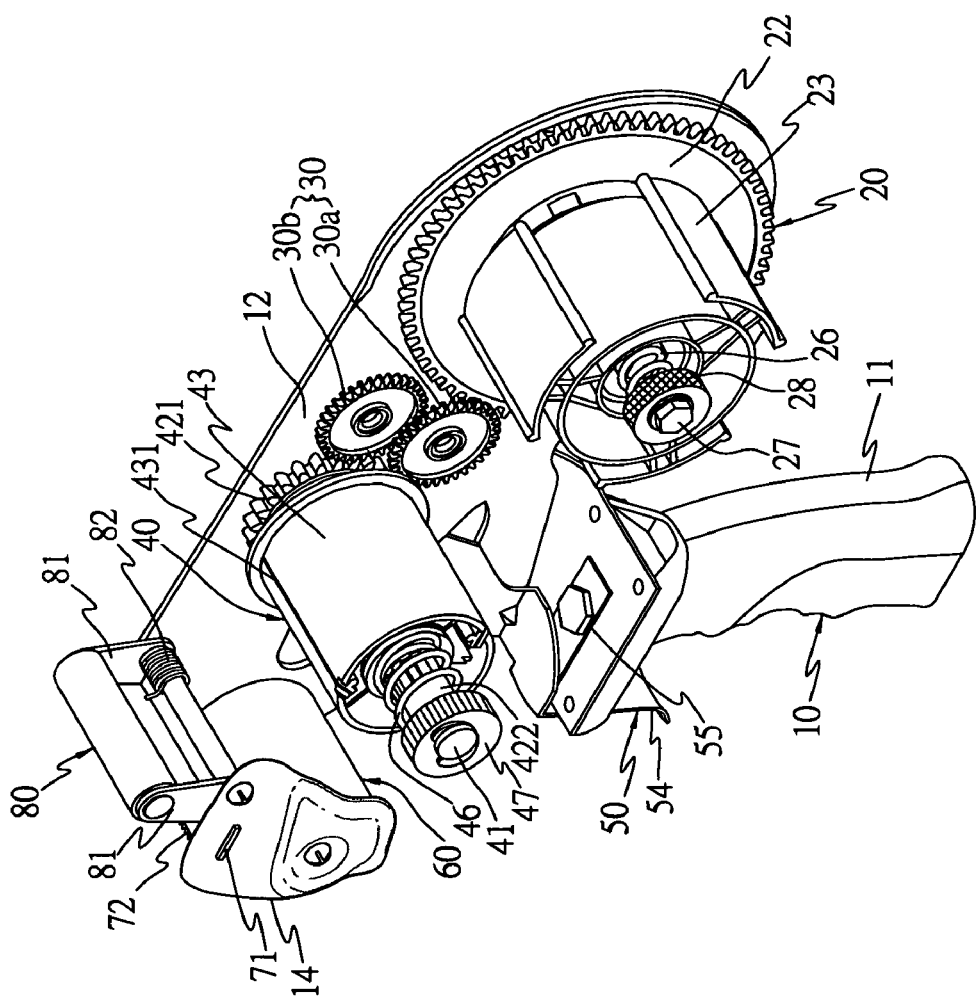
FIG. 1 is a perspective view of a gripping separable-paper peeler in the present invention.
Figure 2:
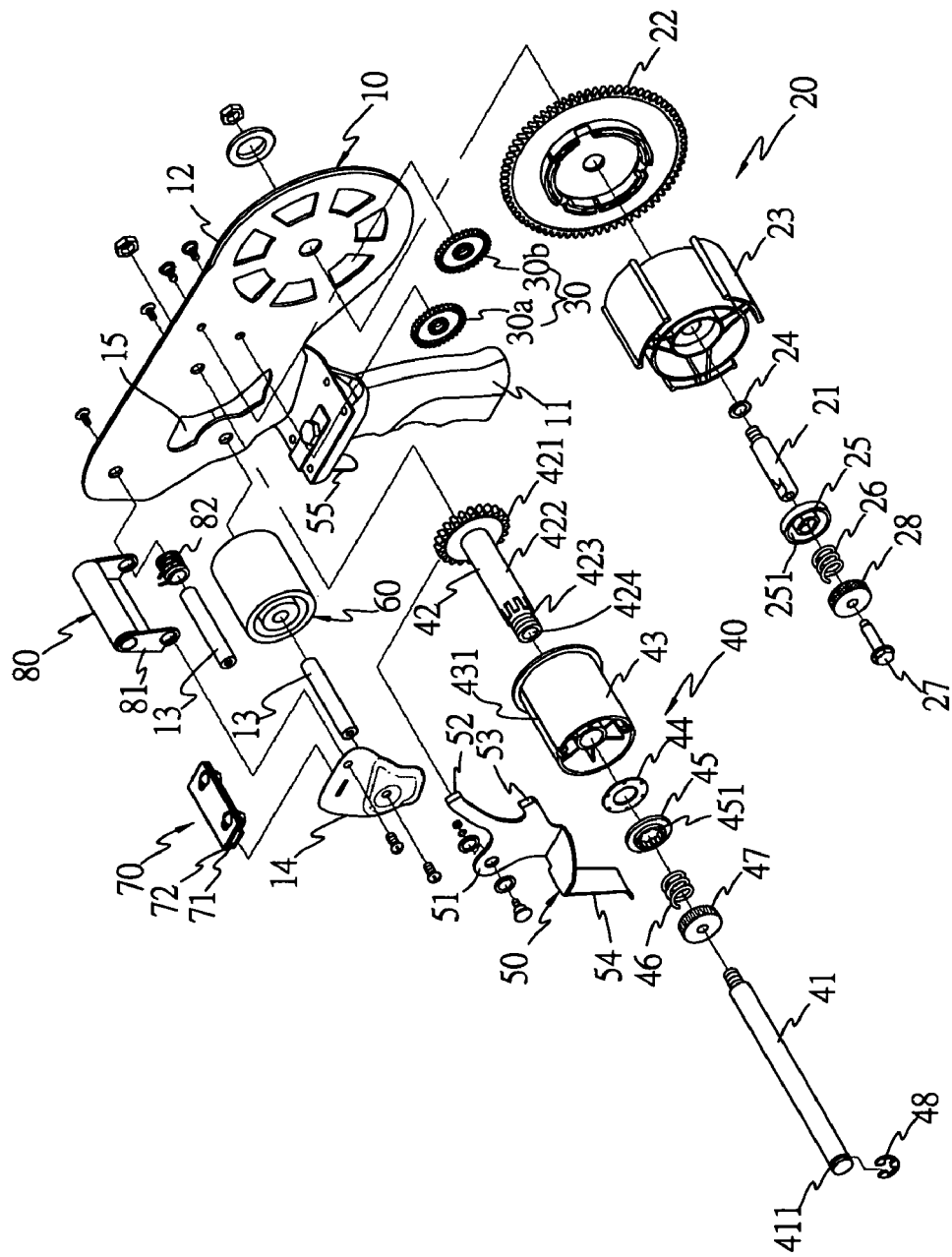
FIG. 2 is a partial exploded perspective view of the gripping separable-paper peeler in the present invention.
Figure 3:
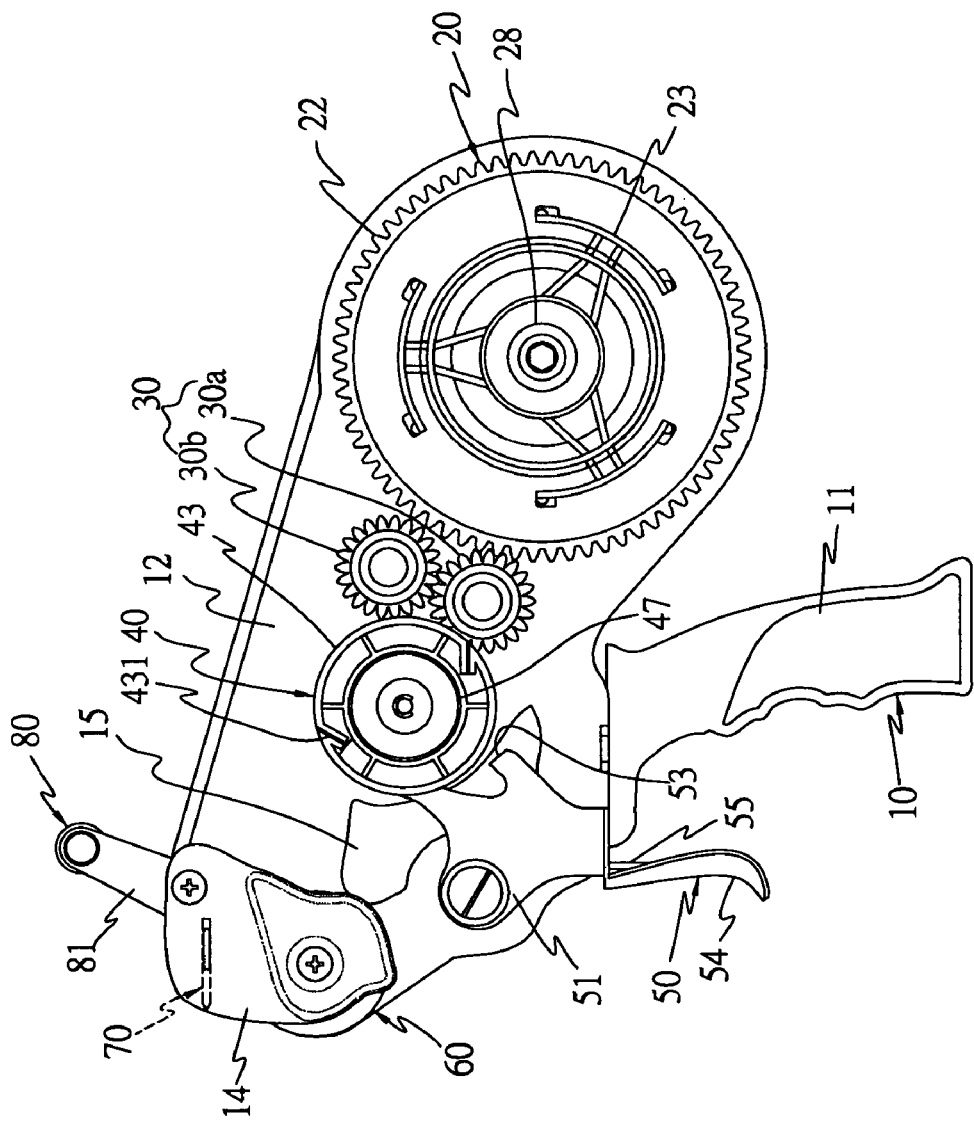
FIG. 3 is a front view of the gripping separable-paper peeler in the present invention.

A preferred embodiment of a gripping separable-paper peeler in the present invention, as shown in FIG. 1, includes a grip frame 10, a paper roll holder 20, two idle gears 30, a separable paper holder 40, a separating member 50, a pushing roller 60, a cutting unit 70, and a pressing roller 80 as main components.

Figure 4:
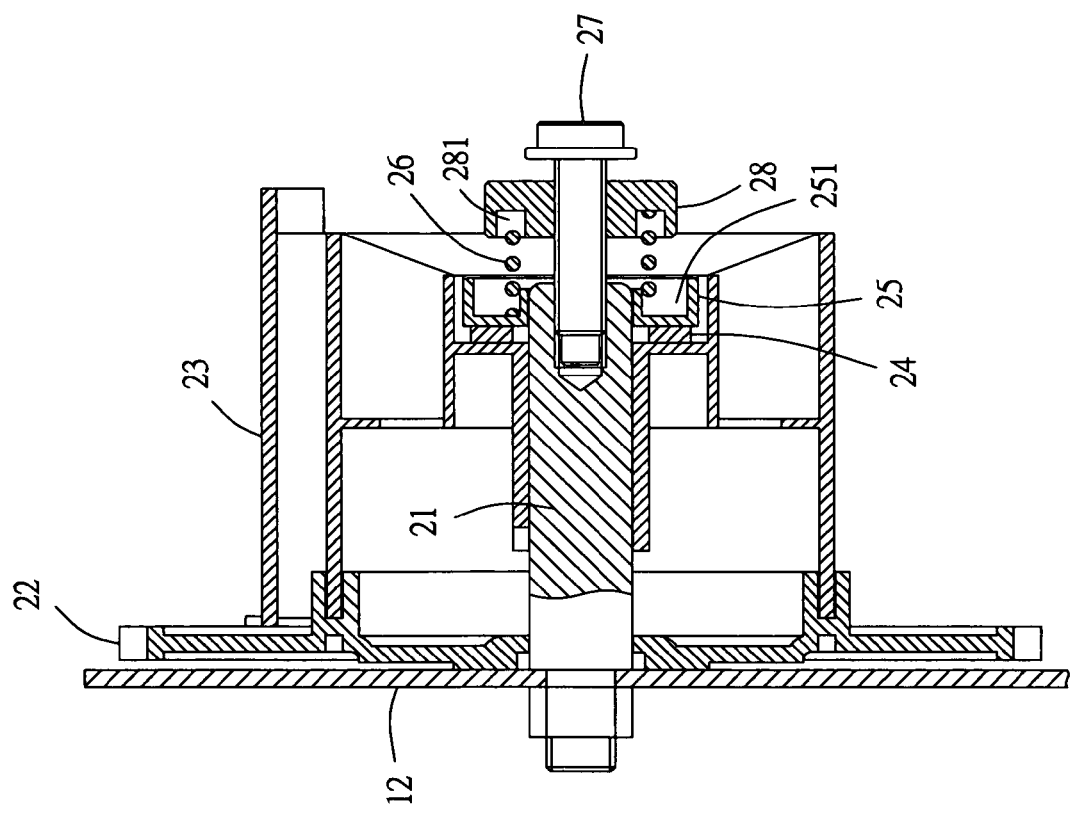
FIG. 4 is a side cross-sectional view of a paper roll holder in the present invention.

The grip frame 10 has a grip 11 and a frame plate 12 fixed on top of the grip 11 by screws, and the frame plate 12 is vertical, and a shaft 13 respectively combined vertically at one end with an upper section and a lower section of a front side of the frame plate 12. Then the other ends of the shafts 13 are fixed with a connect plate 14. Further, the frame plate 12 has an opening 15 in the front portion, The paper roll holder 20, as shown in FIG. 4, consists of a shaft 21 with its one end extending and fixed with a rear portion of the frame plate 12, a first gear 22 pivotally connected with the right end of the shaft 21, a cylindrical member 23 fitted on the shaft 21 and with an inner side of the first gear 22 to rotate together. Further, a soft washer 24 and a spring sustainer 25 are fitted in a center of the free end of the cylindrical member 23, and the spring sustainer 25 has an annular groove 251 in the free end for a compression spring 26 to fit in. The shaft 21 is connected with a bolt 27 at the free end, with an adjusting nut 28 screwing with the bolt 27 and shifted back and forth to alter the elasticity of the compression spring 26 against the cylindrical member 23 so that the cylindrical member 23 and the first gear 22 may be tightened or loosened variously.

The idle gears 30 consists of a first idle gear 30A and a second idle gear 30b respectively fixed on the front portion of the frame plate 12 at the left side of the paper roll holder 20 and engaging and rotating with each other. At the same time the first idle gear 30a also engages with the first gear 22 of the paper roll holder 20.

Figure 5:
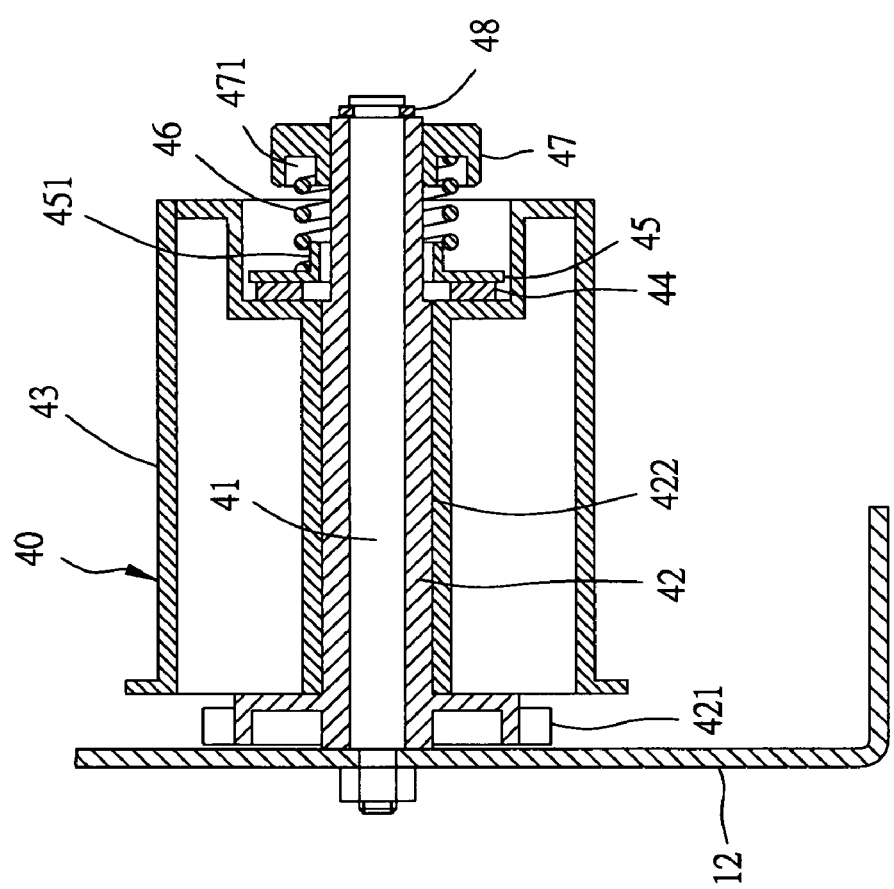
FIG. 5 is a side cross-sectional view of a separable paper holder in the present invention; and, FIG. 6 is a front view of the gripping separable-paper peeler in the present invention, showing it under the peeling condition.

The separable paper holder 40, as shown in FIG. 5, has a shaft 41 with its one end extending to be fixed with the left side of the second idle gear 30b, and with the other end of the shaft 41 formed with an annular groove 411, and a second gear 42 fix ed on the shaft 41. The second gear 42 has a gear body 421 and a tubular shaft 422 extending sidewise from the center of the gear body 421 and provided with a section of male threads 423 at its outer end, The gear body 421 and the tubular shaft 422 both have a center shaft hole 424 for the shaft 41 to extend therein, so the gear body 421 may rest on the inner surface of the frame plate 12 and also engage with the second idle gear 30b to rotate together. Further, the second gear 42 has its tubular shaft 422 fixed with a cylindrical member 43 and a metal washer 44 orderly, and the cylindrical member 43 has two inclined insert slots 431 on its surface for the end of a separable paper to insert therethrough. Further, a spring sustainer 45 is fixed on the tubular shaft 422 of the second gear 42 to contact with the metal washer 44. The spring sustainer 45 has an annular projection 451 extending sidewise from the free end for a compression spring 46 to fit therein stably. In addition, an adjusting nut 47 is screwed with the male threads 423 of the tubular shaft 422 of the second gear 42, and the adjusting nut 47 has a groove 471 for the compression spring to fit therein, and a lock washer 48 is fitted in the annular groove 411 on the end of the second gear 42 so that the cylindrical member 43 and the second gear 42 may be controlled in their rotating tightness by properly screwing the nut 47 back and forth to alter the elasticity of the compression spring 46 against the cylindrical member 43 and subsequently to control the rotating tightness of the cylindrical member 43 and the second gear 42.

The separating member 50 is made of a metal plate properly bent doubly into its shape consisting an upper vertical portion, an intermediate flat portion and a lower vertical portion, with the upper vertical portion having a connective projection 51 to be pivotally connected with a lower section of the left side of the frame plate 12, a long arm 52 extending upward slantingly and a short arm 53 at a lower section 51. The long arm 52 fits stably in a tooth groove of the second gear 42 of the separable paper holder to lock the second gear from rotating. Further, the separating member 50 has the lower vertical portion formed as a pressing member 54 extending down from the intermediate flat portion to be located at the upper left side of the grip 11. Further, an L-shaped plate 55 is fixed with the frame plate 12 on top of the grip 11 to elastically separate from or contact with the pressing member 54 so that the separating member 50 may have the long arm 52 possible to block continually the second gear 42, and also may let the pressing member 54 press the L-shaped plate 55 so that the long arm 52 may be separated from the tooth groove of the second gear 42 to permit the second gear 42 to rotate freely, and subsequently the short arm 53 may extend properly into the opening of the frame plate 12 and keep a preset gap from the tooth groove of the second gear 42. Then the pressing member 54 can manually be pressed to let the short arm 53 contact the relative tooth groove of the second gear 42 for controlling the pressing distance of the separating member 50.

The pushing roller 60 is fitted on the lower shaft 13 located between the frame plate 12 and the connect plate 14, pushing a gluing paper 91 separated from the separating paper roll 90 on an object.

The cutting unit 70 has a blade base 71 and a blade 72, and the blade base 71 is inserted in a limited location between the frame plate 12 and the connect plate 14 for cutting off the gluing paper 91 separated from the separable paper roll 90.

The pressing roller 80 is pivotally connected with a pair of side plates 81 at its two ends, with one of the side plates 81 pivotally connected with the upper shaft 13 on the upper portion of the grip frame 10 and also contact properly the upper section of the blade base 71, with the upper shaft 13 pivotally connected with a torsion coil spring 82 so that the torsion coil spring 82 may have its two ends respectively resting on one of the side plate 81 and blade base 71, and the pressing roller 80 connected with the side plates 81 can be elastically swung to press and slide the gluing paper 91 flatly on an object.

Figure 6:
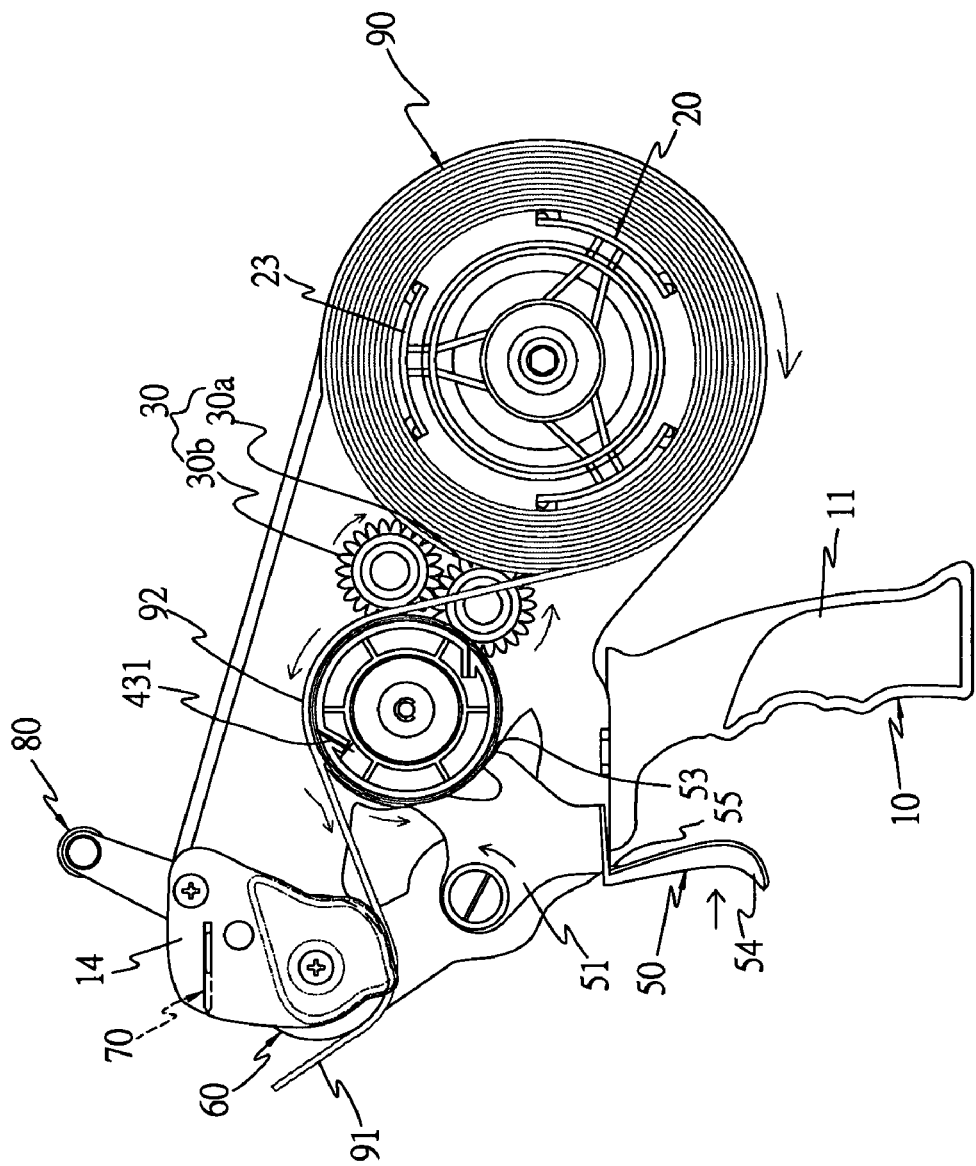

Next, in assembling, referring to FIG. 6, firstly, the separable paper roll 90 is fitted stably on the paper roll holder 20, and a section of the gluing paper 91 is in advance separated from the end of the separable paper roll 90, letting separable paper 92 shift to the left side slantingly and be wound around on the cylindrical member 43 of the separable paper holder 40. Then the end of the separable paper 92 is inserted into the insert grooves 431 in the surface of the cylindrical member 43. At this time, the gluing paper 91 separated is located above the separable paper 92, with the glued surface facing down, so a user adheres the gluing paper 92 on an object. After that, the pressing member 54 of the separating member 50 is pressed inward, letting the long arm 52 separate from the tooth groove of the second gear 42, and the pushing roller 60 pushes the gluing paper 92 and shifts back at the same time, so the separable paper roll 90 may rotate with the paper roll holder 20, and then the first gear 22, the idle gear 30 and the second gear 42 rotate the separable paper holder 40, with the separable paper roll 90 releasing out continually the gluing paper 91 and the separable paper 92 together. Meanwhile, the gluing paper 91 pressed by the pushing roller 60 may form a contained angle with the separable paper 92 on the separable paper holder 40, so the gluing paper 91 and the separable paper 92 on the separable paper roll 90 may be automatically peeled off from each other above the separable paper holder 40. Then the separable paper 92 separated from the gluing paper 91 is continually wound on the separable paper holder 40, and the user can continually place the gluing paper 91 on an abject, with the gluing paper 91 pressed flatly on the object by means of the pressing roller 80 above the pushing roller 60. When adhering operation comes to an end, the user releases the separating member 50 to let the long arm 52 recover to block the tooth groove of the second gear 42, hampering the separable paper roll 90 from extending out. In this way, the gripping separable-paper peeler in the invention can be gripped with a proper angle against an object for letting the gluing paper 91 already adhered on the object stably contact the blade 72 of the cutting unit 70, and then pulled with a little force, to let the gluing paper 91 cut off by the blade 72.

It is important to mention that the gripping separable-paper peeler can be applied to any type of separable paper roll 90, and also the rotating tightness of the paper roll base 20 and the separable paper holder 40 can be adjusted in its rotating tightness so that the separable paper roll 90 fitted on the paper roll holder 20 and the separable paper 92 on the separable paper holder 40 both are impossible to rotate randomly, stabilizing and smoothing separating operation, in addition to the easiness of manufacturing and assemblage of this gripping separable-paper peeler.

While the preferred embodiment of the invention has been described above, it will be recognized and understood that various modifications may be made therein and the appended claims are intended to cover all such modifications that may fall within the spirit and scope of the invention.

What is claimed is:

1. A gripping separable-paper peeler comprising:

A grip frame consisting of a grip and a frame plate extending up from one side of said grip;

A paper roll holder pivotally connected sidewise with a preset location of an inner surface of said frame plate for fitting a separable paper roll thereon so as to let said separable paper roll rotate together with said paper roll holder, a first gear fixed with said paper roll holder;

Two idle gears respectively pivotally connected with the inner surface of said frame plate and consisting of a first idle gear and a second idle gear, said first idle gear engaging with said first gear;

A separable paper holder fixed sidewise on the inner surface of said frame plate by means of a shaft and positioned near said second idle gear, an end of a separable paper possible to be wound on said separable paper holder, said separable paper holder provided with a second gear engaging with said second idle gear so as to rotate together with said paper roll holder to wind said separable paper thereon; and, A pushing roller fixed sidewise with a shaft on a preset location of a lower section of the inner surface of said frame plate for pushing and adhering a piece of gluing paper separated from said separable paper roll;

said gripping separable-paper peeler further comprises a separating plate made of a metal piece properly bent into its shape, said separating plate consisting of an upper vertical portion, an intermediate flat portion and a vertical lower portion, said upper vertical portion having a connective projection, a long arm extending upward slantingly near said connective projection, a short arm projecting near said long arm, said connective projection pivotally connected with a preset location of the inner surface of said frame plate, said long arm elastically fitting in one tooth groove of said second gear of said separable paper roll holder and blocking said separable paper holder from rotating, an L-shaped elastic strip having its upper flat portion fixed on an upper surface of said grip and a vertical portion extending down from said upper flat portion at the left side of said grip, said vertical portion of said L-shaped elastic strip contacting with said vertical lower portion of said separating plate so that when said vertical lower portion is manually pressed to push against said vertical portion of said elastic strip, said long arm may separate from said second gear of said separable paper roll holder to let said separable paper holder rotate freely.

2. The gripping separable-paper peeler as claimed in claim 1, wherein said gripping separable-paper peeler further comprises a pressing roller fixed sidewise with a shaft on a preset location of the inner surface of said frame plate and located on said pushing roller for pressing and adhering said gluing paper flatly on an object.

3. The gripping separable-paper peeler as claimed in claim 2, wherein said frame plate has an upper section and a lower section of the inner surface respectively fixed sidewise with a shaft, shaft A and shaft B, for respectively pivotally connecting with said pushing roller and two side plates pivotally connected with two sides of said pressing roller respectively, said shaft A and shaft B each fixed with a connected plate at their one end, between said connect plate and said frame plate fixed a cutting unit, said cutting unit serving said side plates to rest against to be stabilized, said two side plates having their upper end for said pressing roller to be connected pivotally therebetween, a torsion coil spring fitted around upper shaft having two ends resting against said two side plates and on said cutting unit so that said pressing roller may elastically incline for pressing and adhering said gluing paper on an object.

4. The gripping separable-paper as claimed in claim 1, wherein said paper roll holder further has a shaft that has one end extending to be fixed with said frame plate, a first gear is pivotally connected with said shaft, a cylindrical member is fitted sidewise with said gear and also pivotally connected with said shaft so as to rotated together with said first gear, said separable-paper roll is fitted around said cylindrical member, a soft washer and a spring sustainer are fixed on said shaft, said soft washer received in an annular groove in a free end of said cylindrical member, said spring sustainer having a groove in a free end for receiving an end of a compression spring, a bolt screwing with the free end of said shaft and then with an adjustable nut, said adjustable nut having a groove for receiving the other end of said compression spring, said adjusting nut possible to be adjusted in its location to control the elasticity of said cylindrical member against said compression spring for controlling the rotating tightness of said cylindrical member and said first gear.

5. The gripping separable-paper peeler as claimed in claim 1, wherein said separable paper holder has a shaft that has one end extending to be fixed with said frame plate and the other end formed with an annular groove, said second gear has a gear body and a tubular shaft extending sidewise from a center of said gear body, said tubular shaft having a section of male threads on one end, a cylindrical member and a washer fitting around said tubular shaft, said washer fixed stably in said cylindrical member, a spring sustainer fixed around said tubular shaft, an adjustable nut screwing with said male threads of said tubular shaft and having an annular groove in one side for a compression spring to fit around stably, an adjusting nut screwing with said male threads of said tubular shaft and having a groove in an inner side for the other end of said compression spring to rest stably in, said shaft having an annular groove in an outer end for a lock washer to fit around tightly for limiting the movable position of said second gear and said adjusting nut, said adjusting nut screwed to shift back and forth for adjusting the elasticity of said compression spring against said cylindrical member and subsequently controlling the rotating tightness of said second gear and cylindrical member.

6. The gripping separable-paper peeler as claimed in claim 1, wherein said separable paper holder has an outer circumference, and at least one slanting insert slot formed in said outer circumference for the end of a separable paper to insert therein.

\* \* \* \* \*